United States Patent
Nomura

(10) Patent No.: US 9,519,336 B2
(45) Date of Patent: Dec. 13, 2016

(54) SEMICONDUCTOR INTEGRATED CIRCUIT AND METHOD FOR CONTROLLING POWER SUPPLY IN SEMICONDUCTOR INTEGRATED CIRCUIT

(71) Applicant: CANON KABUSHIKI KAISHA, Tokyo (JP)

(72) Inventor: Yoshihisa Nomura, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/885,852

(22) Filed: Oct. 16, 2015

(65) Prior Publication Data

US 2016/0109924 A1    Apr. 21, 2016

(30) Foreign Application Priority Data

Oct. 21, 2014    (JP) .................................. 2014-214301

(51) Int. Cl.
   *G06F 1/32*    (2006.01)
(52) U.S. Cl.
   CPC .................................. *G06F 1/3287* (2013.01)

(58) Field of Classification Search
   CPC .............................. G06F 1/3284; G06F 1/3287
   See application file for complete search history.

(56) References Cited

U.S. PATENT DOCUMENTS

| 2015/0006936 A1* | 1/2015 | Yasui | G06F 1/3234 713/323 |
| 2015/0089261 A1* | 3/2015 | Segawa | G06F 1/3296 713/322 |

FOREIGN PATENT DOCUMENTS

JP    2009-151573 A    7/2009

* cited by examiner

*Primary Examiner* — Jeffrey Zweizig
(74) *Attorney, Agent, or Firm* — Canon USA, Inc. IP Division

(57) ABSTRACT

A semiconductor integrated circuit includes a control unit that controls power supply to a plurality of power supply domains respectively corresponding to a plurality of functions included in an apparatus. A circuit integrates bus signals between the plurality of power supply domains is included in a specific power supply domain out of the plurality of power supply domains, and the control unit controls the power supply to the specific power supply domain to be performed prior to the other power supply domains connected with the specific power supply domain.

13 Claims, 6 Drawing Sheets

FIG. 4

| POWER SUPPLY DOMAIN / OPERATION MODE | SYSTEM CONTROL UNIT DOMAIN (135) | SCAN PROCESSING UNIT DOMAIN (130) | INTERPRETER/ RENDERER DOMAIN (131) | COMPRESSION/ DECOMPRESSION UNIT DOMAIN (132) | IMAGE PROCESSING UNIT DOMAIN (133) | PRINT PROCESSING UNIT DOMAIN (134) |
|---|---|---|---|---|---|---|
| IDLE | ○ | × | × | × | × | × |
| COPY | ○ | ○ | × | ○ | ○ | ○ |
| PDL PRINT | ○ | × | ○ | ○ | ○ | ○ |
| SEND | ○ | ○ | × | ○ | ○ | × |
| BOX PRINT | ○ | × | × | ○ | × | ○ |

SEMICONDUCTOR INTEGRATED CIRCUIT AND METHOD FOR CONTROLLING POWER SUPPLY IN SEMICONDUCTOR INTEGRATED CIRCUIT

BACKGROUND OF THE INVENTION

Field of the Invention

One disclosed aspect of the embodiments relates to a technology of controlling power supply in a semiconductor integrated circuit such as an application specific integrated circuit (ASIC).

Description of the Related Art

Conventionally, semiconductor integrated circuits are configured such that a plurality of logic circuits is arranged, and these logic circuits are required to perform a high-speed operation for improvement of processing capability. To operate a semiconductor integrated circuit at a high speed, an increase in an operation frequency is necessary. However, if the operation frequency is increased, dynamic power out of power consumption of the semiconductor integrated circuit becomes large. In addition, use of a large number of high-speed operable cells becomes necessary not to fail to provide timing even with a high frequency accompanying the increase in the operation frequency. However, the high-speed operable cells have larger leak power than normal cells.

Meanwhile, in consideration of cost of a package of a chip that forms the semiconductor integrated circuit and cost of a power supply circuit that supplies power to the semiconductor integrated circuit, and in conformity to regulations of various types of power consumption and the like established in individual countries, the power consumption of the semiconductor integrated circuit needs to be suppressed as low as possible. That is, the semiconductor integrated circuit is required to realize both of the high-speed operation and the low power consumption.

In this regard, to decrease the power consumption of the semiconductor integrated circuit, a domain (hereinafter, power supply domain) is configured to integrate logic circuits of each function, and to switch supply and cutoff of the power supply. With such a configuration, when a specific function in an information processing apparatus is in operation, for example, the power consumption can be decreased by cutoff of the power supply of the power supply domain corresponding to a function that is in non-operation.

However, if the supply of the power supply domain corresponding to the function in non-operation is cut off, a level of a signal output from the cut-off power supply domain becomes unstable. This is because a semiconductor element of an output source enters a high_z (high impedance) state, and an input voltage can have values from a minimum value to a maximum value according to an accumulation state of charges. Hereinafter, the signal in this state will be called indefinite signal. Therefore, the logic circuit of the power supply domain to which power supply is cut off (to which the indefinite signal is connected) can have both high and low states (for example, in a case of a low voltage transistor-transistor logic (LVTTL), 0.8 V or less is treated as a low-state logic and 2.0 V or more is treated as a high-state logic), and thus the logic circuit may perform an unexpected operation in some cases.

To address such a problem, a technology of performing power supply control is discussed. According to the technology, one power supply domain is not connected with the other power supply domain in a state where the other power supply domain is connected with the power supply, so that the indefinite signal is not input/propagated (see Japanese Patent Application Laid-Open No. 2009-151573).

However, the technique of Japanese Patent Application Laid-Open No. 2009-151573 cannot be applied to a case where there may be a wide variety of combinations of power supply and power cutoff among a plurality of power supply domains. For example, assume that, in a large-scale integration (LSI) of a multi-function peripheral, the power supply domains are configured for each function unit such as a scan processing unit, a rendering processing unit, a color conversion processing unit, a halftone processing unit, and a print processing unit. These function units are connected by a common system bus, and switch connection interfaces (I/Fs) according to a job to be processed. In this case, for example, the print processing unit has an input I/F that receives an input from the halftone processing unit. In the technique of Japanese Patent Application Laid-Open No. 2009-151573, to change the power supply domain of the print processing unit from a cutoff state to a supply state, the power supply domain of the halftone processing unit needs to be changed from a power supply cutoff state to the power supply state. Further, the halftone processing unit has an input I/F that receives inputs from the color conversion processing unit and the rendering processing unit. Therefore, to change the power supply domain of the halftone processing unit from the power supply cutoff state to the power supply state, similarly, the power supply domains of the color conversion processing unit and the rendering processing unit need to be changed to the power supply state. Further, the color conversion processing unit has an input I/F that receives inputs from the rendering processing unit and the scan processing unit. Therefore, these power supply domains need to be changed to the power supply state. That is, even in a case where only the print processing unit is operated, all of the power supply domains including the halftone processing unit, the color conversion processing unit, the rendering processing unit, and the scan processing unit need to be changed to the power supply state.

As described above, in the case of the technique of Japanese Patent Application Laid-Open No. 2009-151573, there is a problem that the power needs to be supplied to all of the power supply domains depending on a configuration, and a decrease in the power consumption cannot be achieved.

SUMMARY OF THE INVENTION

According to an aspect of the embodiments, a semiconductor integrated circuit includes a control unit configured to control power supply to a plurality of power supply domains respectively corresponding to a plurality of functions included in an apparatus, wherein a circuit configured to integrate bus signals between the plurality of power supply domains is included in a specific power supply domain out of the plurality of power supply domains, and the control unit controls the power supply to the specific power supply domain to be performed prior to the other power supply domains connected with the specific power supply domain.

Further features of the disclosure will become apparent from the following description of exemplary embodiments with reference to the attached drawings.

BRIEF DESCRIPTION OF THE DRAWINGS

FIG. 4 is a table illustrating a relationship between a representative operation mode in a multi-function peripheral and power supply states of respective power supply domains.

DESCRIPTION OF THE EMBODIMENTS

Hereinafter, the disclosure will be described in detail based on an exemplary embodiment with reference to the appended drawings. Configurations described in the exemplary embodiments below are mere examples, and the disclosure is not limited to the illustrated exemplary embodiments.

<Overall Configuration of System>

Figure 1:
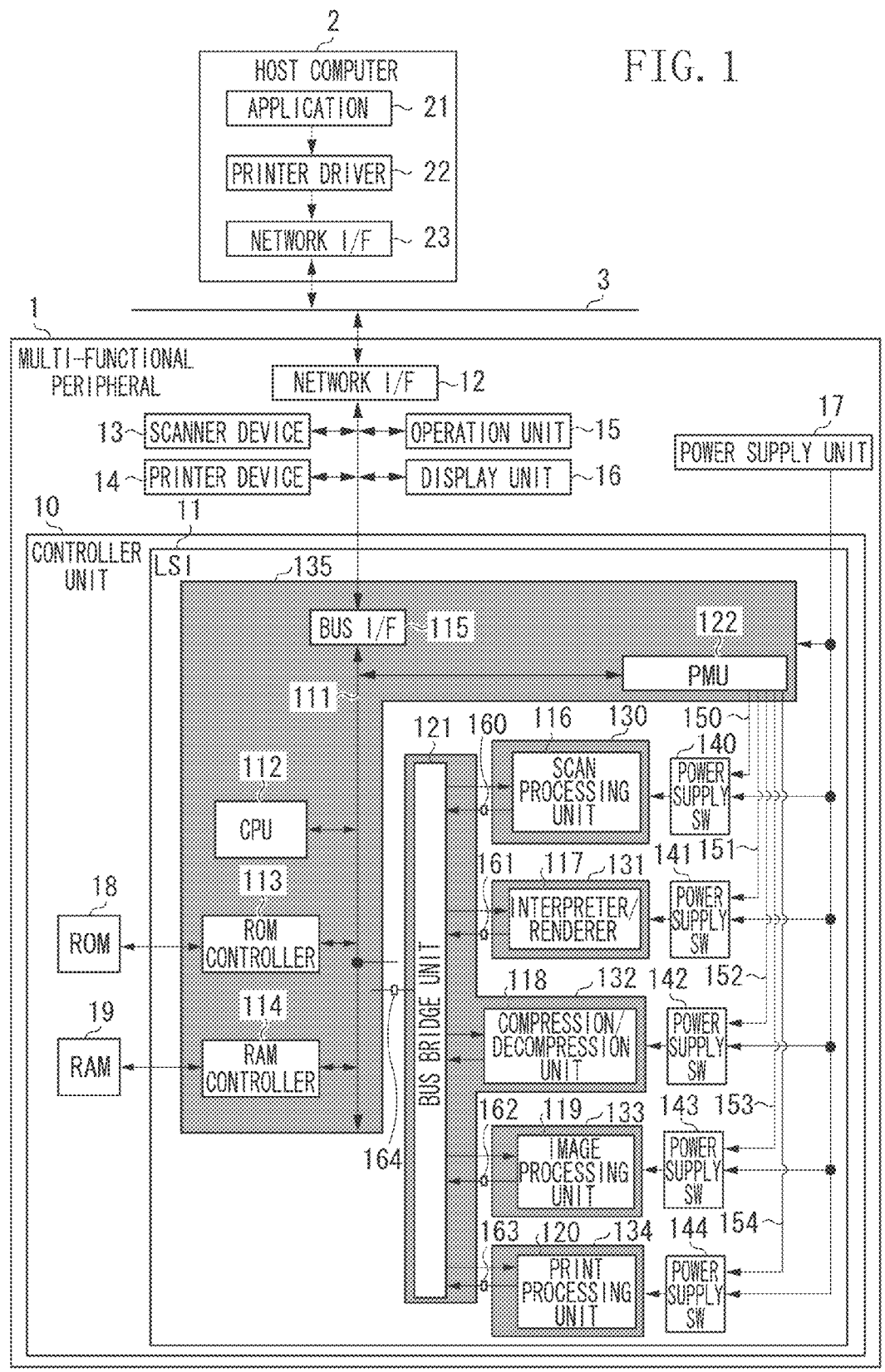
FIG. 1 is a diagram illustrating an example of a configuration of a print system.

FIG. 1 is a diagram illustrating an example of a configuration of a print system according to a first exemplary embodiment. The print system includes a plurality of functions such as a multi-function peripheral including a scan function, a print function, a SEND function, and a BOX storage function, and a host computer 2. The multi-function peripheral 1 and the host computer 2 are mutually connected through a network 3 such as a local area network (LAN).

<Configuration of Host Computer>

The host computer 2 includes an application 21, a printer driver 22, and a network I/F 12.

The application 21 is an application operated on the host computer 2. When the application 21 is a document creation application, the application 21 enables creation of various types of documents such as a page layout document, a word processor document, and a graphic document. Document data (digital data) created with the application is sent to the printer driver 22, and a rendering command based on the document data is generated. As the rendering command generated in the printer driver 22, a printer description language called page description language (PDL) is typically used. The rendering command usually includes an instruction for rendering data such as texts, graphics, and images. The rendering command generated in the printer driver 22 is then transmitted to the multi-function peripheral 1 through the network 3. The multi-function peripheral 1 that has received the rendering command converts the rendering command into predetermined image data, and prints the image data on a recording medium such as a paper.

<Configuration of Multi-Function Peripheral>

The multi-function peripheral 1 includes a controller unit 10, a network I/F 12, a scanner device 13, and a printer device 14. Further, the controller unit 10 includes an LSI 11, a read only memory (ROM) 18, and a random access memory (RAM) 19.

The LSI 11 is a semiconductor integrated circuit including a plurality of modules such as a central processing unit (CPU) 112, and the modules are connected through a system bus 111. Further, the LSI 11 is connected to the ROM 18 and the RAM 19 via a ROM controller 113 and the RAM controller 114. Further, the LSI 11 is connected with the scanner device 13 and the printer device 14, and reads scan data and executes printing.

The network I/F 12 is an interface module with the network 3. The network I/F 12 performs bidirectional data communication including reception of the rendering command from another device and transmission of device information (such as jam information and size information) of the multi-function peripheral 1, through the network 3, based on a communication protocol such as Ethernet (registered trademark).

The scanner device 13 is connected with the controller unit 10, and scan a document and generate scan data. The generated scan data is sent to a scan processing unit 116 in the LSI 11.

The printer device 14 is connected with the controller unit 10, and forms an image on a recording medium based on image data received from an image processing unit 119. An operation unit 15 is an interface used by a user to perform various input operations.

A display unit 16 includes a liquid crystal monitor and the like, and displays a user interface (UI) screen that presents an instruction to the user and a state of the multi-function peripheral 1.

A power supply unit 17 is a unit that supplies power to the controller unit 10, and includes a rectifier that converts an external alternating current power supply to direct current power supply, a direct current/direct current (DC/DC) converter that generates voltages suitable for each device.

The ROM 18 is a read-only memory device in which various programs are stored.

The RAM 19 is a memory device in which a firm program executed by the CPU 112 is stored, and which is used as a work memory. The RAM 19 loads a program stored in the ROM 18 and temporarily stores the program, and the CPU 112 executes the program and outputs instructions to the various modules. Further, data generated by each module when the module executes the instruction and the like are also temporarily stored in the RAM 19. Firmware (F/W) from a hard disk drive (HDD, not illustrated) may be expanded on the RAM 19.

The system bus 111 is a bus for connecting with a memory device through the CPU 112, the ROM controller 113, or the RAM controller 114, or connecting with each processing unit through a bus bridge unit 121.

The ROM controller 113 is a memory controller for reading data according to a predefined protocol, and controls the ROM 18 via the CPU 112 or a direct memory access (DMA) controller (not illustrated).

The RAM controller 114 is a memory controller for reading or writing data according to a predefined protocol, and controls the RAM 19 via the CPU 112 or a DMA controller.

A bus I/F 115 is an interface circuit for accessing an external device from the LSI 11. For example, the bus I/F 115 accesses the host computer 2 through the network I/F 12, or exchanges data and commands with the operation unit 15 and the display unit 16. The bus I/F 115 includes I/Fs such as a universal serial bus (USB), a serial advanced technology attachment (SATA), and a peripheral component interconnect (PCI) (not illustrated).

The scan processing unit 116 controls reading of scan data at predetermined timing, and performs processing for correcting the read scan data according to a characteristic of a light-receiving unit (not illustrated) (density correction or geometric correction), for the scanner device 13.

An interpreter/renderer 117 performs processing for interpreting the rendering command received through the network I/F 12 and generating intermediate language data, and generating a raster image data from the generated intermediate language data.

A compression/decompression unit 118 performs processing for compressing Joint Photographic Experts Group (JPEG) or Joint Bi-level Image Experts Group (JBIG) to temporarily cause the size of image data not to be large, or decompressing the compressed image data.

The image processing unit 119 performs image processing such as color conversion processing, correction processing, pseudo halftone processing, and halftone processing, on the raster image data generated in the interpreter/renderer 117.

A print processing unit 120 performs processing for pulse width modulation to laser-output the image data subjected to the various types of image processing in the image processing unit 119 with the printer device 14, and processing for outputting the image data at timing according to a characteristic of the printer device 14.

An image data bus is connected to the processing units, and exchanges the image data under control of the CPU 112.

Figure 2:
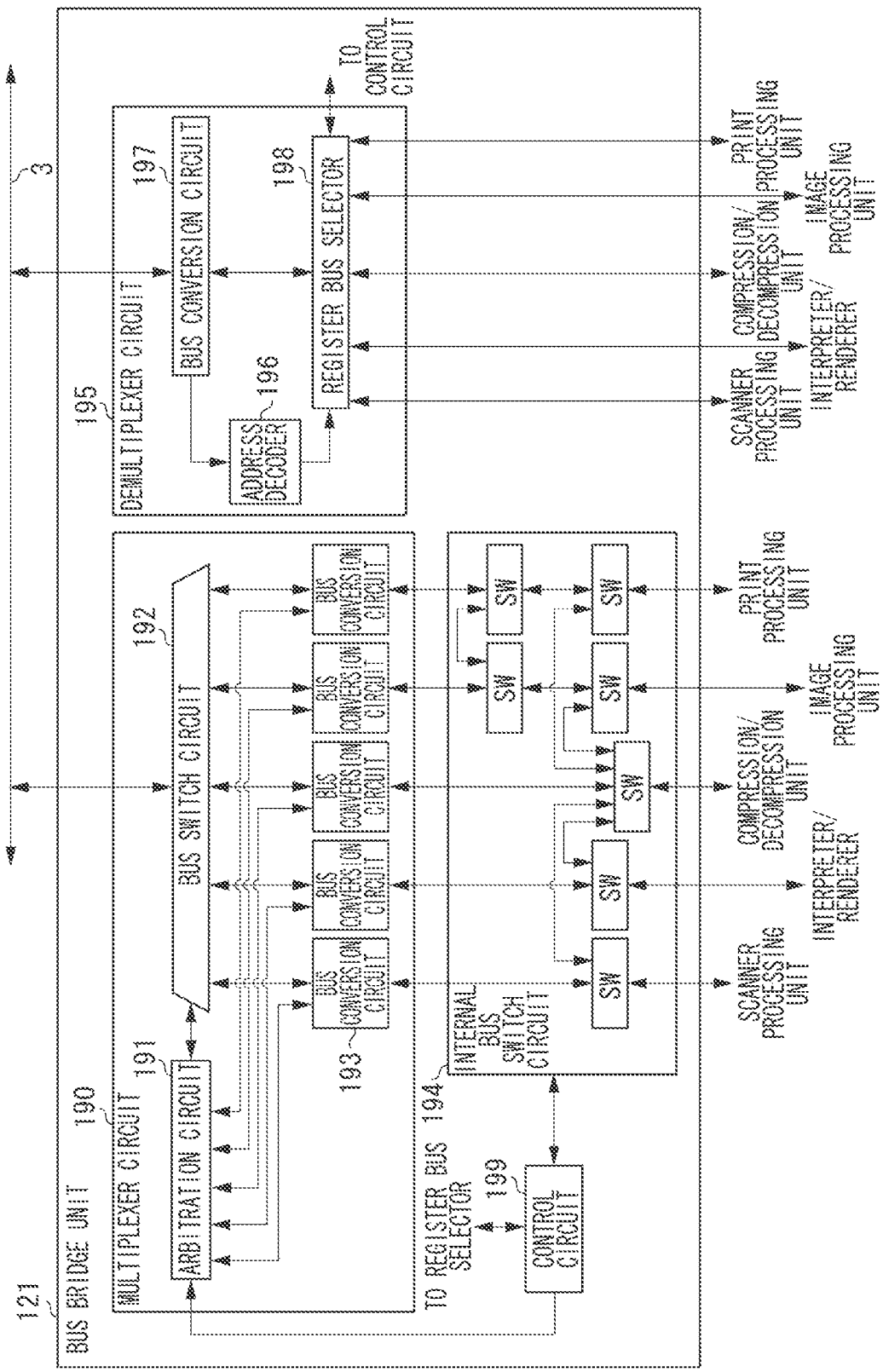
FIG. 2 is a block diagram illustrating details of a bus bridge unit.

The bus bridge unit 121 is a circuit unit that converts each bus access between busses and performs communication, and includes a bus switch circuit, a bus conversion circuit, a multiplexer circuit, and a demultiplexer circuit. FIG. 2 is a block diagram illustrating details of the bus bridge unit 121. Hereinafter, detailed description will be given.

A multiplexer circuit 190 is a circuit that integrates a plurality of signals input from a plurality of signal lines, and outputs an integrated signal. The multiplexer circuit 190 includes an arbitration circuit 191, a bus switch circuit 192, and a plurality of bus conversion circuits 193.

The arbitration circuit 191 returns an acknowledge signal of access permission according to priority of a request when having received the request from the bus conversion circuit 193.

The bus switch circuit 192 stores data in an internal buffer according to control signals of the arbitration circuit 191 and the bus conversion circuit 193. Further, the bus switch circuit 192 performs data transmission to each transfer destination in conformity to a bus protocol of the system bus 111, according to a received address and an internal buffer state.

The bus conversion circuit 193 performs bus protocol conversion from the internal bus to the system bus 111, or from the system bus 111 to the internal bus. The bus conversion circuit 193 outputs the request to the arbitration circuit 191 when having stored data in the internal buffer, and transmits the data to a transmission destination in conformity to the protocol of the system bus 111 when having received the acknowledge signal. The bus conversion circuit 193 has a DMA function, and can perform read/write to/from the memory device such as the ROM 18 or the RAM 19 connected to the system bus 111 without passing through the CPU 112.

An internal bus switch circuit 194 switches a connection destination of the internal bus according to a control signal from a control circuit 199. For example, the internal bus switch circuit 194 connects data of the scan processing unit 116 or an output signal from the interpreter/renderer 117 to the compression/decompression unit 118, thereby to enable continuance of the processing without spooling the data or the output signal in the RAM 19. Similarly, the internal bus switch circuit 194 can connect an output signal from the compression/decompression unit 118 to the image processing unit 119, and an output signal from the image processing unit 119 to the print processing unit 120. Each switch (SW) includes a buffer or a flip-flop, and drives the output signal.

A demultiplexer circuit 195 is a circuit that performs bus conversion and address decoding, and divides a signal into register access control signals directed to the respective processing units when the CPU 112 performs register access through the system bus 111. The demultiplexer circuit 195 includes an address decoder 196, a bus conversion circuit 197, and a register bus selector 198.

The bus conversion circuit 197 performs protocol conversion from the system bus 111 to the internal bus.

The address decoder 196 detects an address accessed by the CPU 112, and outputs a control signal to the register bus selector 198 to access a desired processing unit.

The register bus selector 198 generates a chip select signal from the control signal, and performs a register access to any of the processing units with the register address and data.

The above is description of the bus bridge unit 121.

A power management unit (PMU) 122 is a power supply control circuit that has a function to change a power supply level with a power supply control signal, by performing register setting upon receiving an instruction from the CPU 112.

In FIG. 1, regions in gray illustrate power supply domains, and six power supply domains 130 to 135 correspond to each function (processing units), as described below.

The power supply domain 130: the scan processing unit
The power supply domain 131: the interpreter/renderer
The power supply domain 132: the compression/decompression unit
The power supply domain 133: the image processing unit
The power supply domain 134: the print processing unit
The power supply domain 135: a system control unit Among the power supply domains, the power supply domains 130 to 134 separately receive the power supply from the power supply unit 17. The power supply domain 135 is always in a power supply state when the power supply unit 17 is in power supply setting. The power supply domains 130 to 134 are connected to the power supply unit 17 through respective power supply SWs, and the power is supplied to or cut off from a semiconductor element in the power supply domain.

Power supply SWs 140 to 144 are circuits that supply or cut off the power supply to/from the corresponding power supply domains 130 to 134. The respective power supply SWs supply one of Vdd and Vss supplied from the power supply unit 17 according to power supply control signals 150 to 154 from the PMU 122 to the respective power supply domains (see FIG. 3 described below). For example, the power supply SWs are configured to switch the power supply using a metal oxide semiconductor field effect transistor (MOSFET).

The power supply control signals 150 to 154 are signals that respectively switch the power supply SWs 140 to 144, and output levels of the signals can be switched to an active state by making a register setting of the PMU 122 by the CPU 112. The register setting of the PMU 122 at the time of reset and the time of cancellation of reset is to cause the output levels of the power supply control signals to be in an non-active state. That is, the power supply control signals 150 to 154 are not in the active state (activated state) unless an instruction is given from the CPU 112. Therefore, the power supply domains 130 to 134 at the time of an input of the power supply are in the power supply cutoff state because the output levels of the power supply control signals 150 to 154 are in the non-active state.

Figure 3:
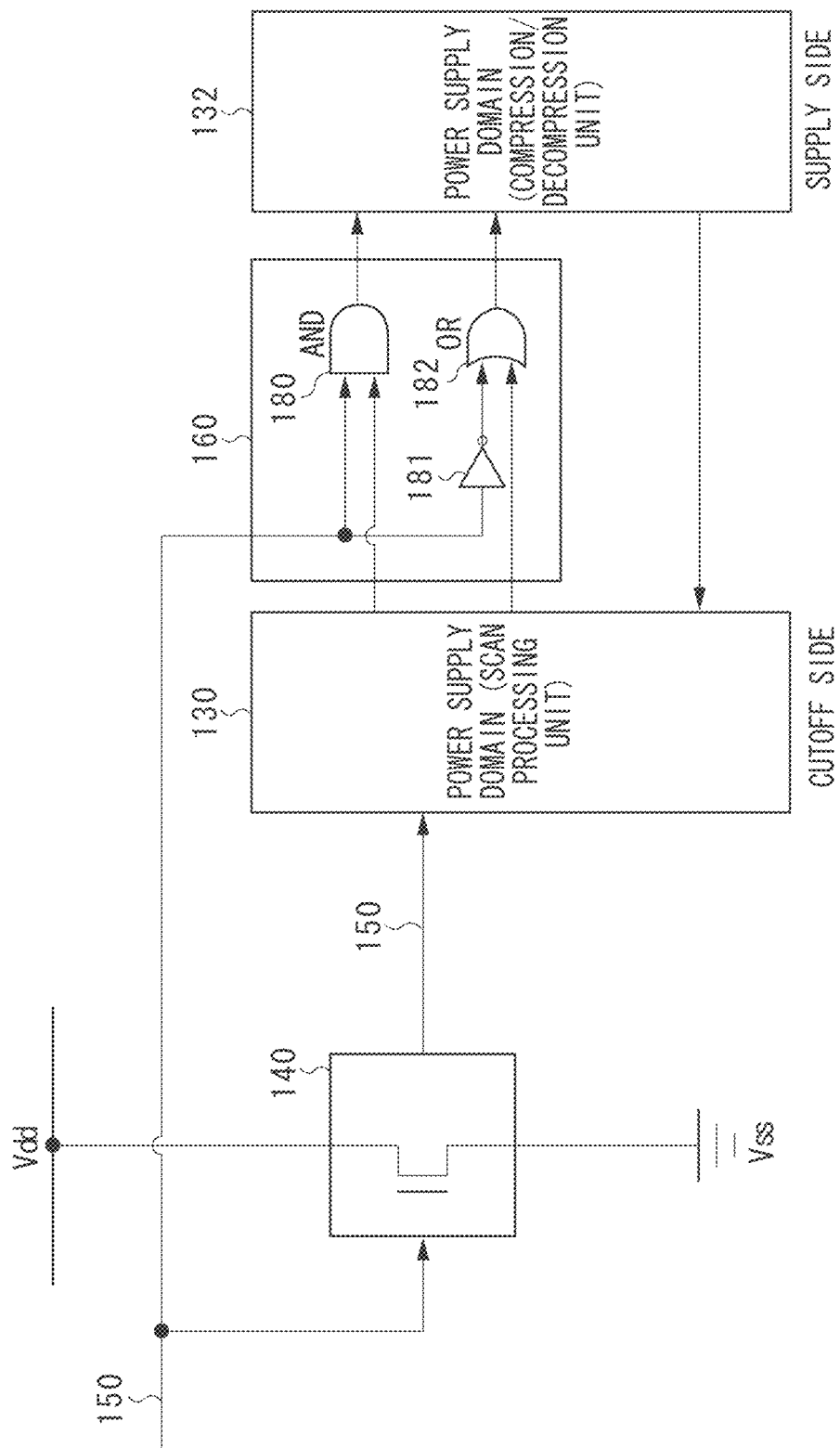
FIG. 3 is a diagram for describing an operation of an isolator circuit.

Isolators 160 to 164 are protection circuits that hold a signal value so that when the power supply is cut off by the power supply SW, the indefinite signal is not input or propagated to the power supply domain side to which the power is supplied from the cut-off power supply domain side. Accordingly, damage of the semiconductor element in the power supply domain in operation due to an input of the indefinite signal can be prevented. Detailed description will be given using the isolator circuit 160 as an example. FIG. 3 is a diagram for describing an operation of the isolator circuit 160. The isolator 160 is configured of a combination circuit with the power supply control signal 150 so that the output signal from the power supply domain 130 to which power supply is cut off, to the power supply domain 132 to which power is supplied, does not become the indefinite signal. For example, when the output signal to the power supply domain 132 is a high active signal (a signal that reaches the high level in the active state), the power supply control signal 150 and an AND circuit 180 are combined. In this case, at the time of the power supply, the signal is output at a high level and at the time of the power supply cutoff, the signal is fixed to a low level of the power supply control signal 150. Meanwhile, when the output signal to the power supply domain 132 is a low active signal (a signal that reaches a low level at the active state), the power supply control signal 150 inverted by an inverter 181 and an OR circuit 182 are combined. In this case, the signal is output at a low level at the time of the power supply, and is fixed to a high level at the time of the power supply cutoff.

Next, power supply control of the multi-function peripheral 1 according to the present exemplary embodiment will be described in detail.

FIG. 4 is a table illustrating a relationship between representative operation modes in the multi-function peripheral 1 and power supply states of each power supply domain. The ○ marks indicate the power supply state, and the x marks indicate the power supply cutoff state. SEND of the operation modes is a function to transmit the scan data read in the scanner device 13 to the host computer 2 and the like through the network, as JPEG compression data or the like. Further, BOX print is a function to read and print the image data stored in the memory such as the HDD in advance. Hereinafter, description will be given for each operation mode along the table of FIG. 4.

When the operation mode is IDLE, the power supply is controlled to be supplied only to the power supply domain 135 (system control unit domain), and the power supply to the power supply domains 130 to 134 corresponding to the other function units is controlled to be cut off.

When the operation mode is copy, the power supply domain 131 (interpreter/renderer domain) is not used, and thus the power supply to the power supply domain 131 is controlled to be cut off, and the power supply is controlled to be supplied to the other power supply domains. Details will be described below.

When the operation mode is PDL print, the power supply domain 130 (scan processing unit domain) is not used and thus the power supply to the power supply domain 130 is controlled to be cut off, and the power supply is controlled to be supplied to the other power supply domains. Details will be described below.

When the operation mode is SEND, the power supply domain 131 (interpreter/renderer domain) and the power supply domain 134 (print processing unit domain) are not used. Therefore, the power supply to the power supply domains 131 and 134 is controlled to be cut off, and the power is controlled to be supplied to the other power supply domains. That is, the power supply is controlled in this case such that the print processing unit domain is added to the power cut off target at the time of the above-described copy mode.

When the operation mode is BOX print, the power supply domain 130 (scan processing unit domain), the power supply domain 131 (interpreter/renderer domain), and the power supply domain 133 (image processing unit domain) are not used. Therefore, the power supply to the power supply domains 130, 131, and 133 is cut off. Then, the power supply is controlled to be supplied to the other power supply domains. That is, the power supply in this case is controlled such that the scan processing unit domain and the image processing unit domain are added to the power cut off target at the time of the above-described copy mode.

From the above description, in the present exemplary embodiment, the power supply domain 132 corresponding to the compression/decompression unit 118 that is the function unit having a high use frequency, out of the power supply domains 130 to 134 corresponding to each function unit, is treated as the power supply domain having high priority when the power is supplied. That is, an input order of the power supply is controlled such that the power is supplied to the power supply domain 132 having many circle marks in the table of FIG. 4 which corresponds to the compression/decompression function used in all of the operation modes except IDLE, in priority to the power supply domains 130, 131, 133, and 134 corresponding to the other function units.

The operation modes of the multi-function peripheral 1 are not limited to the above-described modes, and other operation modes (for example, a FAX mode) may be included. In that case, with respect to the power supply domain corresponding to the function of the operation mode, supply and cutoff of the power may be controlled, by the above-described method for the power supply control.

<Power Supply Control in Each Operation Mode>

Next, details of the power supply control in the present exemplary embodiment will be described for each operation mode. First, assume that the LSI 11 of the controller unit 10 is in the IDLE state (in the state where the power supply to the power supply domains 130 to 134 is cut off, and the power is being supplied to the power supply domain 135), and the CPU 112 is in an operable state, before start of a copy operation. Under this state, the output signal from the power supply domain in the power supply cutoff state to the power supply domain in the power supply state exists between the power supply domain 132 (compression/decompression unit domain) and the power supply domain 135 (system control unit domain). Since the power supply domain 132 is in the power supply cutoff state, the output signal is fixed to the level of the non-active state by the isolator 164. The output signal from the power supply domain 135 to the power supply domain 132 is not provided with an isolator. The reason is that, while the power supply domains 130 to 134 are in the power supply cutoff state at the time of an input of the power, as described above, the power supply to the power supply domain 135 is always performed prior to the power supply to the power supply domain 132, and thus the indefinite signal is not propagated. As described above, in the configuration of the present exemplary embodiment, the output signal from the power supply domain higher in an input order of the power, to the power supply domain lower in an input order is not provided with the isolator.

Based on the above assumption, a power supply control sequence according to the present exemplary embodiment will be described in detail, using cases in the copy mode and the PDL print mode as examples.

<Power Supply Control in Copy Mode>

Figure 5A:
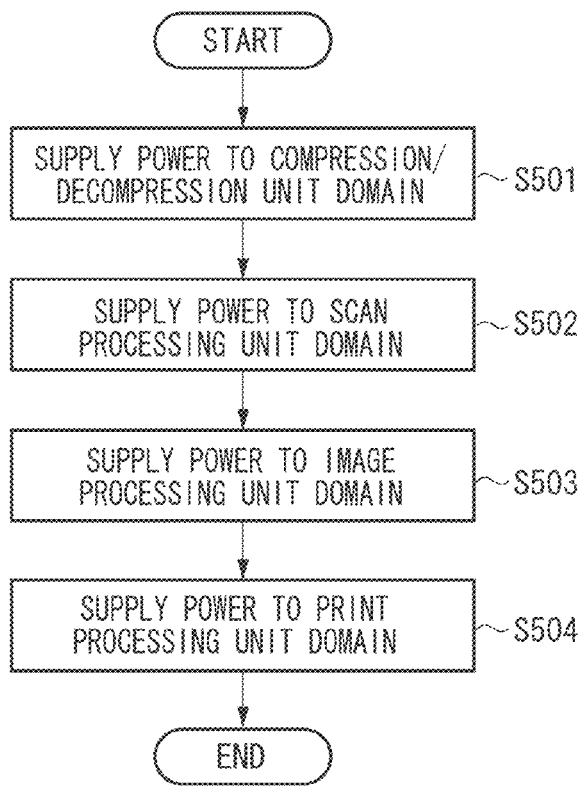
FIGS. 5A and 5B are flowcharts illustrating flows of power supply control performed when the operation mode is a copy mode.
Figure 5B:
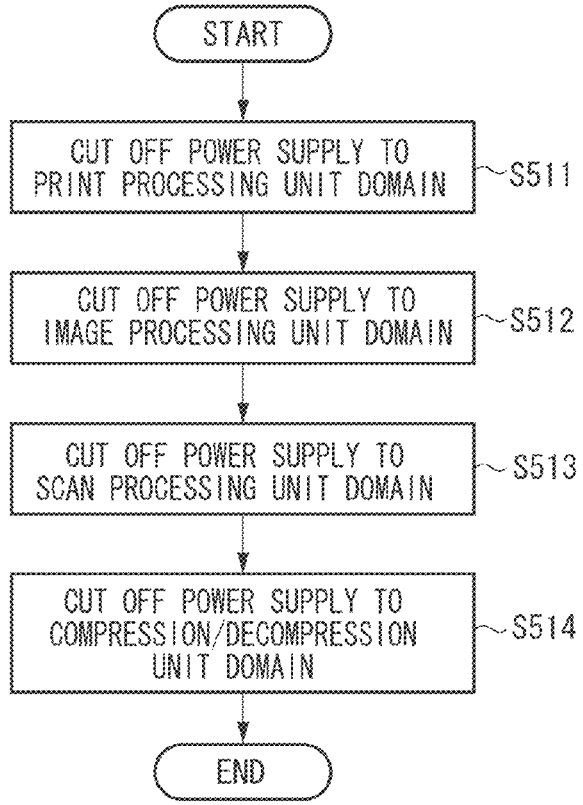

FIGS. 5A and 5B are flowcharts illustrating flows of the power supply control when the operation mode of the multi-function peripheral 1 is the copy mode. FIG. 5A illustrates control in a case of supplying the power, and FIG. 5B illustrates control in a case of cutting off the power, respectively.

First, the power supply control in the copy mode will be described along the flowchart of FIG. 5A.

When a user sets a document on the scanner device 13, and presses a copy button on the operation unit 15, control of supplying the power to the power supply domain necessary for the copy operation is started.

In step S501, the CPU 112 makes a setting for supplying the power to the power supply domain 132 (compression/decompression unit domain), to the PMU 122. Thus, the power supply control signal 152 enters the active state, and the power supply domain 132 is switched to the power supply state by the power supply SW 142. At this time, since the power supply control signal 152 of the PMU 122 is changed to the high-level signal, the signal level fixed to the non-active state by the isolator 164 is changed to the signal level driven by the power supply domain 132. That is, the signal level of the high active signal is changed to the high level and the signal level of the low active signal is changed to the low level. Here, the output signal from the power supply domain in the power supply cutoff state to the power supply domain in the power supply state exists between the power supply domains 130, 131, 133, and 134, and the power supply domain 132. The signal level in this case is fixed to the level of the non-active state by the isolators 160 to 163. Therefore, the indefinite signal is not propagated. The output signals from the power supply domain 132 to the power supply domains 130, 131, 133, and 134 are not provided with an isolator. This is because the power supply is supplied to the power supply domain 132 first and the indefinite signal is not propagated to the power supply domains 130, 131, 133, and 134.

In step S502, the CPU 112 makes a setting for supplying the power to the power supply domain 130 (scan processing unit domain), to the PMU 122. Thus, the power supply control signal 150 enters the active state, and the power supply domain 130 is switched to the power supply state by the power supply SW 140. At this time, the power supply control signal 150 of the PMU 122 is changed to the high-level signal. Therefore, the signal level fixed to the non-active state by the isolator 160 is changed to the signal level driven by the power supply domain 130.

In step S503, the CPU 112 makes a setting for supplying the power supply to the power supply domain 133 (image processing unit domain), to the PMU 122. Thus, the power supply control signal 153 enters the active state, and the power supply domain 133 is switched to the power supply state by the power supply SW 143. At this time, the power supply control signal 153 of the PMU 122 is changed to the high-level signal. Therefore, the signal level fixed to the non-active state by the isolator 162 is changed to the signal level driven by the power supply domain 133.

In step S504, the CPU 112 makes a setting for supplying the power to the power supply domain 134 (print processing unit domain), to the PMU 122. Thus, the power supply control signal 154 enters the active state, and the power supply domain 134 is switched to the power supply state by the power supply SW 144. At this time, the power supply control signal 154 of the PMU 122 is changed to the high-level signal. Therefore, the signal level fixed to the non-active level by the isolator 163 is changed to the signal level driven by the power supply domain 134.

The above is the details of the power supply control at the time of the copy mode. After execution of the sequence, the CPU 112 performs the copy operation along the program. Details of the copy operation are not the point of the disclosure, and thus description is omitted. In steps S502 to S504 in the flow of FIG. 5A, the power is supplied in the order of the scan processing unit domain, the image processing unit domain, and the print processing unit domain. However, the power supply may be in no particular order. The important thing is that the power supply to the power supply domain 132 corresponding to the compression/decompression unit 118 that is a function having a high use frequency is performed prior to the power supply to the other power supply domains.

Next, the power supply cutoff control at the time of the copy mode will be described along the flowchart of FIG. 5B. When the copy operation is terminated, the CPU 112 starts the power supply cutoff control to return the state to the original IDLE state.

In step S511, the CPU 112 makes a setting for cutting off the power supply to the power supply domain 134 (print processing unit domain), to the PMU 122. Therefore, the power supply control signal 154 enters the non-active state, and the power supply to the power supply domain 134 is cut off by the power supply SW 144. At this time, the power supply control signal 154 of the PMU 122 is changed to the low-level signal. Therefore, the signal level is fixed to the signal level of the non-active state by the isolator 163 from the signal level driven by the power supply domain 134. That is, the high active signal is fixed to the low-level signal, and the low active signal is fixed to the high-level signal.

In step S512, the CPU 112 makes a setting for cutting off the power supply to the power supply domain 133 (image processing unit domain), to the PMU 122. Thus, the power supply control signal 153 is changed to the low-level signal. Therefore, the signal level is fixed to the signal level of the non-active state by the isolator 162 from the signal level driven by the power supply domain 133.

In step S513, the CPU 112 makes a setting for cutting off the power supply to the power supply domain 130 (scan processing unit domain), to the PMU 122. Thus, the power supply control signal 150 is changed to the low-level signal. Therefore, the signal level is fixed to the signal level of the non-active state by the isolator 160 from the signal level driven by the power supply domain 130.

In step S514, the CPU 112 makes a setting for cutting off the power supply to the power supply domain 132 (compression/decompression unit domain), to the PMU 122. Thus, the power supply control signal 152 is changed to the low-level signal. Therefore, the signal level is fixed to the signal level of the non-active state by the isolator 164 from the signal level driven by the power supply domain 132.

The above is the details of the power supply cutoff control. In steps S511 to S513 in the flow of FIG. 5B, the power supply is cut off in the order of the print processing unit domain, the image processing unit domain, and the scan processing unit domain. However, the cut-off may be in no particular order. The important thing is that the power supply cutoff to the power supply domain 132 corresponding to the compression/decompression unit 118 that is the function having a high use frequency is performed after the power supply cutoff to the other power supply domains.

As described above, in the power supply control at the time of the copy mode, the power supply to the power supply domain 132 (compression/decompression unit domain) having high priority out of the power supply domains 130 to 134, is performed first, and the power supply cutoff is performed last. With such control, the input signals to the power supply domains 130, 133, and 134 to which the output signal from the power supply domain 132 is connected do not become the indefinite signal. Further, the power supply domain 131 (interpreter/renderer domain) that is in the power supply cutoff state is fixed to the level of the non-active state by the isolator 161. Thus, there is no propagation of the indefinite signal.

When as a data path, the interpreter/renderer 117 in the power supply domain 131 is directly connected to the image processing unit 119 in the power supply domain 133, the power needs to be supplied to the power supply domain 131 before the power supply to the power supply domain 133 is performed. Therefore, the power consumption may not be decreased, or installing an isolator between the power supply domain 131 and the power supply domain 133 becomes necessary, so that the circuit scale is increased. However, by installing a bus bridge circuit in the power supply domain 132, supply and cutoff control of the power and installing the isolator between the power supply domain 131 and the power supply domain 133 become unnecessary.

Further, similarly, in a case where a direct connection is established as a resister bus from the scan processing unit 116, the interpreter/renderer 117, the image processing unit 119, and the print processing unit 120 to the system bus 111, propagation of the indefinite signal can be eliminated only by the isolator 164. That is, only the isolator 164 is required for an I/F signal (a signal between the bus bridge unit 121 and the system bus 111) from the power supply domain 132 to the system bus 111.

Further, the bus bridge unit 121 decodes a high-order bit of an address to generate a select signal of an appropriate block, an address area of the signal line of the internal bus becomes small. To be specific, when the CPU 112 accesses the bus bridge unit 121, the bus bridge unit 121 needs a 3-bit address to sort the received address into five blocks (the processing units 116 to 120). For example, the system bus 111 may just use a 18-bit width address area and the processing units 116 to 120 may just use 16-bit width address area. Accordingly, it becomes unnecessary to connect higher address data. Further, in the case of a simple protocol that does not perform handshaking, the number of protocol control signal lines is decreased. Therefore, the number of connection signal lines from the power supply cutoff domain to the power supply domain can be decreased. As a result, the number of isolators 160 to 164 to be inserted can be decreased.

<Power Supply Control in PDL Print Mode>

Figure 6A:
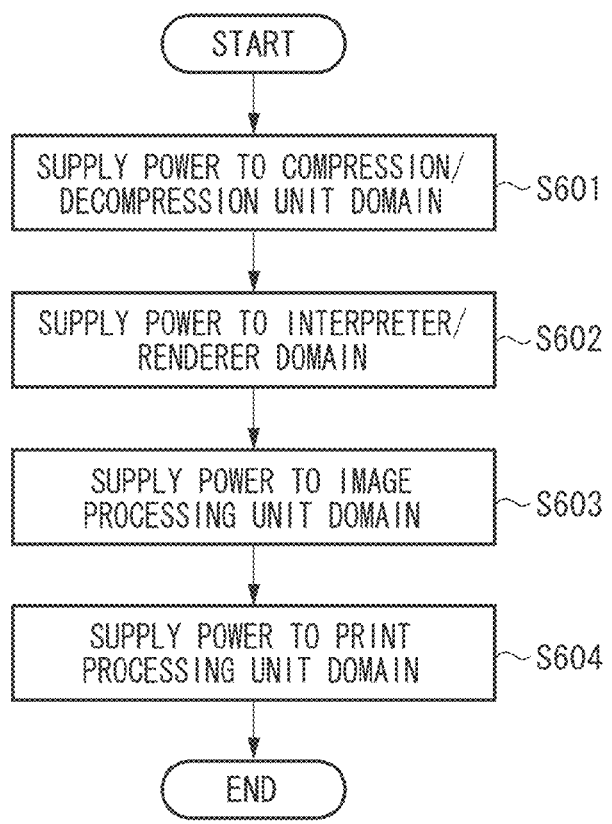
FIGS. 6A and 6B are flowcharts illustrating flows of power supply control performed when the operation mode is a page description language (PDL) print mode.
Figure 6B:
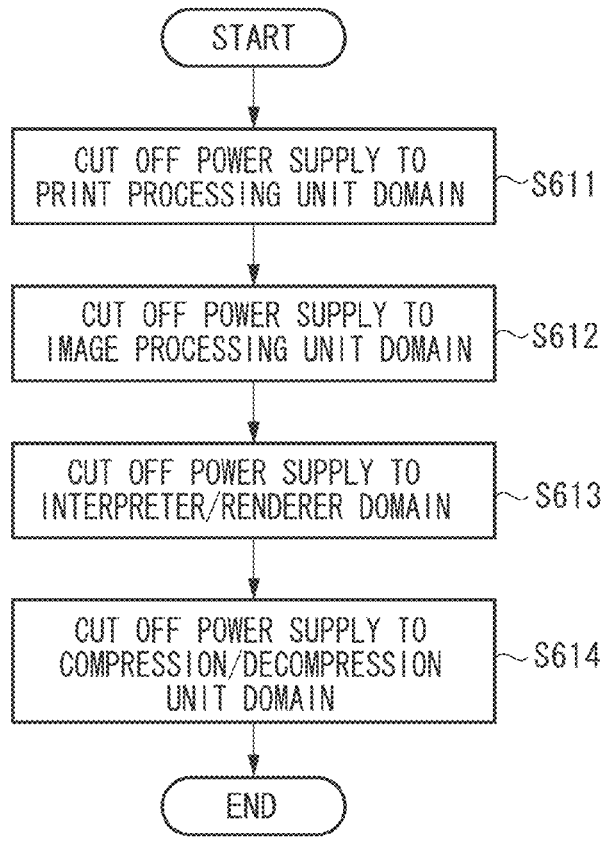

Next, details of the power supply control in the present exemplary embodiment in a case where the operation mode is the PDL print mode will be described. FIGS. 6A and 6B are flowcharts illustrating flows of the power supply control when the operation mode of the multi-function peripheral 1 is the PDL print mode. FIG. 6A illustrates control in a case of supplying the power, and FIG. 6B illustrates control in a case of cutting off the power supply.

First, the power supply control at the time of the PDL print mode will be described along the flowchart of FIG. 6A. When an instruction to print document data created with the application 21 or the like is given the PDL data is transmitted to the multi-function peripheral 1 through the network I/F 12. Then, the control of supplying the power to the power supply domain necessary for the PDL print operation is started in the procedure below.

In step S601, the CPU 112 makes a setting for supplying the power to the power supply domain 132 (compression/decompression unit domain), to the PMU 122. Thus, the power supply control signal 152 enters the active state, and the power supply domain 132 is switched to the power supply state by the power supply SW 142. At this time, the power supply control signal 152 of the PMU 122 is changed to the high-level signal. Therefore, the signal level fixed to the non-active state by the isolator 164 is changed to the signal level driven by the power supply domain 132. That is, the signal level of the high active signal is changed to the high level, and the signal level of the low active signal is changed to the low level. Here, as described above, the output signal from the power supply domain in the power supply cutoff state to the power supply domain in the power supply state exists between the power supply domains 130, 131, 133, and 134, and the power supply domain 132. Then, the signal level in this case is fixed to the level of the non-active state by the isolators 160 to 163. Therefore, the indefinite signal is not propagated. The reason why no isolator is provided in the output signals from the power supply domain 132 to the power supply domains 130, 131, 133, and 134 is described above.

In step S602, the CPU 112 makes a setting for supplying the power to the power supply domain 131 (interpreter/renderer domain), to the PMU 122. Thus, the power supply control signal 151 enters the active state, and the power supply domain 131 is switched to the power supply state by the power supply SW 141. At this time, the power supply control signal 151 of the PMU 122 is changed to the high-level signal. Therefore, the signal level fixed to the level of the non-active state by the isolator 161 is changed to the signal level driven by the power supply domain 131.

In step S603, the CPU 112 makes a setting for supplying the power to the power supply domain 133 (image processing unit domain), to the PMU 122. Thus, the power supply control signal 153 enters the active state, and the power supply domain 133 is switched to the power supply state by the power supply SW 143. At this time, the power supply control signal 153 of the PMU 122 is changed to the high-level signal. Therefore, the signal level fixed to the non-active state by the isolator 162 is changed to the signal level driven by the power supply domain 133.

In step S604, the CPU 112 makes a setting for supplying the power to the power supply domain 134 (print processing unit domain), to the PMU 122. Thus, the power supply control signal 154 enters the active state, and the power supply domain 134 is switched to the power supply state by the power supply SW 144. At this time, the power supply control signal 154 of the PMU 122 is changed to the high-level signal. Therefore, the signal level fixed to the non-active state by the isolator 163 is changed to the signal level driven by the power supply domain 134.

The above is the details of the power supply control at the time of the PDL print mode. The CPU 112 performs the PDL print operation along the program after execution of this sequence. Details of the PDL print operation are not the point of the disclosure, and thus description is omitted. In steps S602 to S604 in the flow of FIG. 6A, the power is supplied in the order of the interpreter/renderer domain, the image processing unit domain, and the print processing unit domain. However, the power supply may be in no particular order. The important thing is that the power supply to the power supply domain 132 corresponding to the compression/decompression unit 118 that is a function having a high use frequency is performed prior to the power supply to the other power supply domains.

Next, the power supply cutoff control at the time of the PDL print mode will be described along the flowchart of FIG. 6B. When the PDL print operation is terminated, the CPU 112 starts the power supply cutoff control to return the state to the original IDLE state.

In step S611, the CPU 112 makes a setting for cutting off the power supply to the power supply domain 134 (print processing unit domain), to the PMU 122. Thus, the power supply control signal 154 enters the non-active state, and the power supply to the power supply domain 134 is cut off by the power supply SW 144. At this time, the power supply control signal 154 of the PMU 122 is changed to the low-level signal. Therefore, the signal level is fixed to the signal level of the non-active state by the isolator 163 from the signal level driven by the power supply domain 134. That is, the high active signal is fixed to the low-level signal, and the low active signal is fixed to the high-level signal.

In step S612, the CPU 112 makes a setting for cutting off the power supply to the power supply domain 133 (image processing unit domain), to the PMU 122. Thus, the power supply control signal 153 is changed to the low-level signal. Therefore, the signal level is fixed to the non-active state by the isolator 162 from the signal level driven by the power supply domain 133.

In step S613, the CPU 112 makes a setting for cutting off the power supply to the power supply domain 131 (interpreter/renderer domain), to the PMU 122. Thus, the power supply control signal 151 is changed to the low-level signal. Therefore, the signal level is fixed to the signal level of the non-active state by the isolator 161 from the signal level driven by the power supply domain 131.

In step S614, the CPU 112 makes a setting for cutting off the power supply to the power supply domain 132 (compression/decompression unit domain), to the PMU 122. Thus, the power supply control signal 152 is changed to the low-level signal. Therefore, the signal level is fixed to the signal level of the non-active state by the isolator 164 from the signal level driven by the power supply domain 132.

The above is the details of the power supply cutoff control. In steps S611 to S613 in the flow of FIG. 6B, the power supply is cut off in the order of the print processing unit domain, the image processing unit domain, and the interpreter/renderer domain. However, the cut-off may be in no particular order. The important thing is that the power supply to the power supply domain 132 corresponding to the compression/decompression unit 118 that is a function having a high use frequency is performed after the power supply cutoff to the other power supply domains.

As described above, similarly to the copy mode, the power supply to the power supply domain 132 (compression/decompression unit domain) out of the power supply domains 130 to 134 is controlled to be supplied first, and to be cut off last. With such control, the input signals to the power supply domains 131, 133, and 134 to which the output signal from the power supply domain 132 is connected do not become the indefinite signal. Further, the power supply domain 130 (scan processing unit domain) that is in the power supply cutoff state is fixed to the level of the non-active state by the isolator 160, and thus there is no propagation of the indefinite signal. Further, the number of connection signal lines from the power supply cut-off domain to the power supply domain becomes small. As a result, the number of the isolators 160 to 164 to be inserted can be decreased.

OTHER EMBODIMENTS

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-214301, filed Oct. 21, 2014, which is hereby incorporated by reference herein in its entirety.

What is claimed is:

1. A semiconductor integrated circuit comprising:
a control unit configured to control supply of power to a plurality of power supply domains respectively corresponding to a plurality of functions included in an apparatus, wherein
a circuit configured to integrate bus signals between the plurality of power supply domains is included in a specific power supply domain out of the plurality of power supply domains, and
the control unit performs control such that the supply of power to the specific power supply domain is carried out prior to the other power supply domains connected with the specific power supply domain.

2. The semiconductor integrated circuit according to claim 1, wherein the control unit further controls cutoff of the power supply to the specific power supply domain to be performed after the cutoff of the power supply to the other power supply domains.

3. The semiconductor integrated circuit according to claim 1, wherein an isolator that holds a signal value is provided on an output signal line from the other supply domains to the specific power supply domain, and an isolator that holds a signal value is not provided on an output signal line from the specific power supply domain to the other power supply domains.

4. The semiconductor integrated circuit according to claim 1, wherein the specific power supply domain is a power supply domain corresponding to a function having a high use frequency out of the plurality of functions included in the apparatus.

5. The semiconductor integrated circuit according to claim 1, wherein the bus signals include a signal of an image data bus.

6. The semiconductor integrated circuit according to claim 1, wherein the bus signals include a signal of a register bus.

7. The semiconductor integrated circuit according to claim 1, wherein the apparatus is an image forming apparatus including at least a print function.

8. A method for controlling power supply to a plurality of power supply domains, in a semiconductor integrated circuit including the plurality of power supply domains respectively corresponding to a plurality of functions included in an apparatus, the semiconductor integrated circuit including, in a specific power supply domain out of the plurality of power supply domains, a circuit configured to integrate bus signals between the plurality of power supply domains, the method comprising:

controlling the power supply to the specific power supply domain to be performed prior to the other power supply domains connected with the specific power supply domain.

9. The method according to claim 8, further comprising:
controlling cutoff of the power supply to the specific power supply domain to be performed after the cutoff of the power supply to the other power supply domains.

10. The method according to claim 8, wherein
an isolator that holds a signal value is provided on an output signal line from the other power supply domains to the specific power supply domain, and an isolator that holds a signal value is not provided on an output signal line from the specific power supply domain to the other power supply domains.

11. The method according to claim 8, wherein the specific power supply domain is a power supply domain corresponding to a function having a high use frequency, out of the plurality of functions included in the apparatus.

12. The method according to claim 8, wherein the bus signals include a signal of an image data bus.

13. The method according to claim 8, wherein the bus signals include a signal of a register bus.

* * * * *